United States Patent [19]

Bradley et al.

[11] 3,926,299

[45] Dec. 16, 1975

[54] METHOD FOR STORAGE OF WOUND ROLLS OF PAPER

[75] Inventors: John J. Bradley; Ernst Daniel Nystrand, both of Green Bay, Wis.

[73] Assignee: Paper Converting Machine Company, Green Bay, Wis.

[22] Filed: July 29, 1974

[21] Appl. No.: 492,761

[52] U.S. Cl................ 198/20 R; 198/154; 198/172; 214/152; 198/79
[51] Int. Cl.²....................................... B65G 47/00
[58] Field of Search ........... 198/172, 173, 221, 102, 198/29, 37, 79, 156, 20 R, 154; 214/6 TS, 6 BA, 16.4 R, 152

[56] References Cited
UNITED STATES PATENTS

| | | | |
|---|---|---|---|
| 3,499,555 | 3/1970 | Wahle | 214/6 TS |
| 3,701,407 | 10/1972 | Kulig | 198/20 R |
| 3,754,632 | 8/1973 | Kreutter | 214/6 TS |
| 3,762,582 | 10/1973 | Barnhart et al. | 198/20 R |

Primary Examiner—James R. Marbert
Assistant Examiner—James M. Slattery
Attorney, Agent, or Firm—Dawson, Tilton, Fallon & Lungmus

[57] ABSTRACT

A log storage unit for elongated rolls of web material wherein logs are horizontally displaced from a saw infeed conveyor onto a conveyor traveling in a horizontal path, and when the horizontal path conveyor has accumulated a predetermined number of logs, the logs as a group are elevated along a second and vertical path.

1 Claim, 7 Drawing Figures

METHOD FOR STORAGE OF WOUND ROLLS OF PAPER

BACKGROUND AND SUMMARY OF INVENTION

This invention relates to a log storage unit and method of storing logs. It has particular application to the paper converting industry, i.e., wherein logs are axially elongated wound rolls — such as are used for toilet paper or toweling. Illustrative of the prior art in this area are U.S. Pat. Nos. 3,016,780 and 3,762,582.

Increasing emphasis has been placed upon the high speed production of disposable paper products such as toilet tissue and toweling. Over the last 20 years, or so, the industry has changed from stop-start winders to continuous winders and from speeds below 1,000 feet per minute to over 2,000 feet per minute and often with much greater web widths. The winding referred to has been the "rewinding" of the web from the jumbo sized parent rolls (often in excess of 6 feet in diameter) into the retail sized rolls which are only a few inches in diameter. Also, over the years, it has been deemed desirable to saw the retail sized logs after rewinding, rather than slitting the web as it passes through the rewinder, i.e., separating the rewinding and cutting-to-length functions. This has brought about the development of a system which begins with unwinding the roll and ending with the rolls being placed in cartons for shipment. At the high production rates contemplated, it is apparent that large quantities of paper (and therefore money) could be lost or at least jeopardized if one portion of the system broke down or was inoperative while another portion continued to function. This has led to the provision of "cant accumulators" as described in the above-identified patents.

The instant invention goes beyond the prior art in providing a log storage unit and method which is uniquely designed for a high production system and one, moreover, which is efficiently arranged so as to store the maximum number of logs in a most compact space. It will be appreciated that with high speed, high volume systems, the need for storage may exist periodically, independent of any system failure. For example, changeover of the winder would not necessarily correlate with any changeover of the wrapping machinery. Thus, the storage unit must be flexible to accommodate to these changes, yet not be overly complex or expensive because of its essentially auxiliary function. This multiple objective we have achieved through a unit which embodies a pair of orthogonally related conveyor systems, the horizontal conveyor initially receiving logs sequentially from the saw in-feed conveyor and, after a predetermined number of logs are accumulated on the first conveyor, the logs are elevated as a group by a second conveyor and, where the saw demands logs from the unit, the operations are reversed seriatim.

DETAILED DESCRIPTION

The invention is described in conjunction with an illustrative embodiment in the accompanying drawing, in which FIG. 1 is a fragmentary perspective view of a portion of a rewinder line and featuring prominently the inventive log storage unit;

Figure 2:
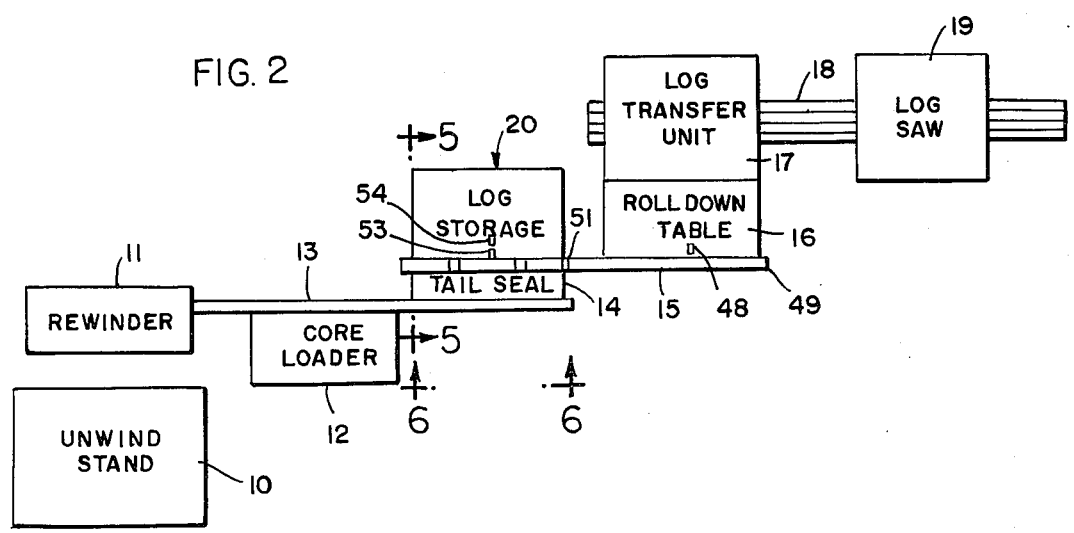
FIG. 2 is a schematic diagram of a rewinder line.

In the illustration given, and with reference first to FIG. 2, the numeral 10 designates a schematic or block representation of an unwind stand. At this position a jumbo or parent roll is unwound for passing through a rewinder designated 11. The rewinder winds the web about paperboard cores which are advantageously provided from a core loader 12. Normally, during the rewinding, the web is transversely perforated to facilitate detachment of the usual squares of toweling or toilet paper. Following the rewinding of a predetermined number of such squares, the small diameter but elongated logs are removed along a roll stripper conveyor 13. In many cases the conveyor 13 may also conduct the cores from the core loader 12 into position within the rewinder 11. Thereafter, in the illustration given, the logs are removed from the conveyor 13 and pass through a tail seal unit 14 wherein the loose end of the web is adhered to the underlying convolution of the roll.

When all of the elements of the rewinder line are functioning, a roll issuing from the tail seal unit is delivered to a saw infeed conveyor 15, thence down a roll down table 16 into a log transfer unit 17. Inasmuch as the illustration given relates to a high capacity rewinder line, a plurality of log delivery lane 18 are shown issuing from the log transfer unit to deliver logs to a log saw 19. As the logs are severed transversely by the log saw, the severed units are conducted out of the log saw (still within the lanes 18) to packaging or cartoning machinery (not shown) but which would normally be provided to the right of the schematic diagram pictured in FIG. 2.

The invention here is particularly concerned with the log storage unit generally designated 20 and which is advantageously interposed between the tail seal unit 14 and the roll down table 16. It should be appreciated that in some instances, the conveyors 13 and 15 may be placed in line — as where the tail sealing is achieved within the rewinder 11. In such a case, the tail seal unit 14 is omitted but the function of the log storage unit 20 remains, i.e., storing logs between the rewinder and the roll down table or other means for feeding the log saw 19. As indicated previously, one important function provided by the log storage unit 20 is to provide a source of logs even where the rewinder line is functioning properly. For example, the rewinder may require shutdown periodically for the introduction of a new parent roll. At such a time, it will not be necessary to shut down the log saw because logs accumulated in the log storage unit 20 may be retrieved for continuation of production.

Figure 1:
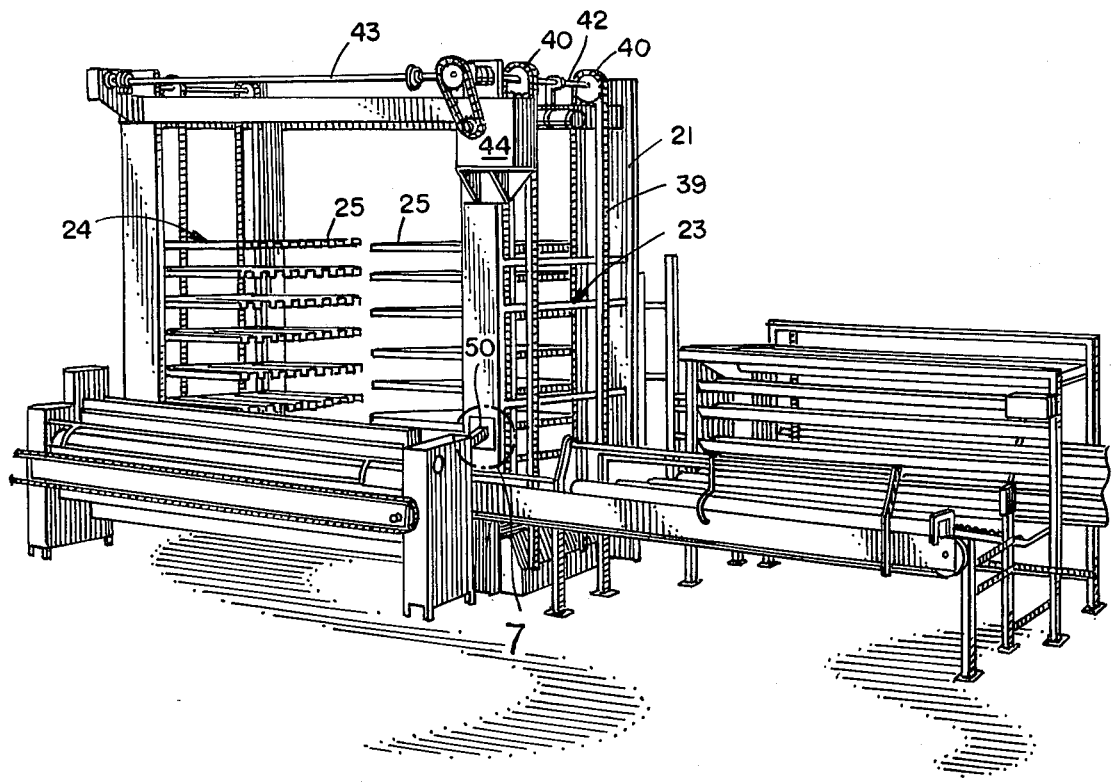

In the illustration given, the log storage unit 20 includes a frame — see FIG. 1 which is essentially rectangular in profile and is constructed to accommodate 100 logs.

Figure 3:
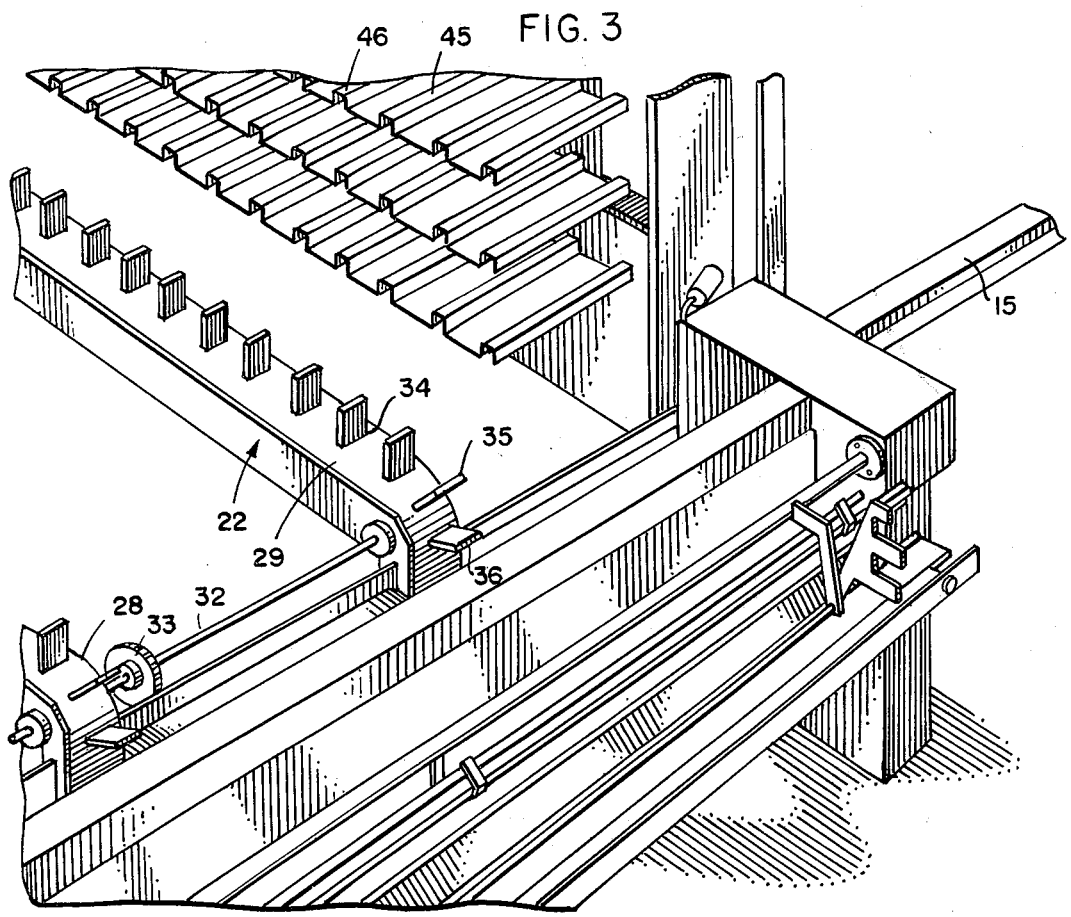
FIG. 3 is a fragmentary perspective view of a portion of the log storage unit and showing the orthogonally related conveyor.
Figure 5:
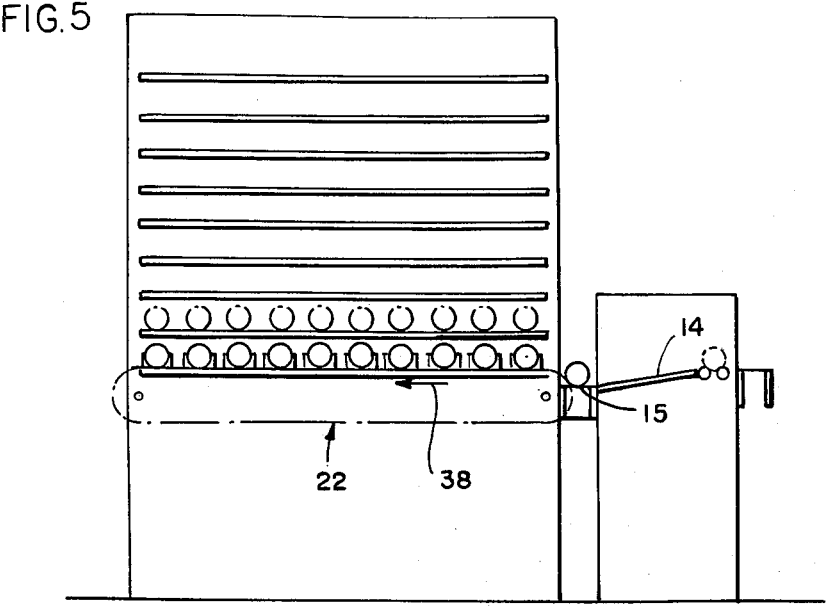
FIG. 5 is a side elevational view such as would be seen essentially along the line 5—5 applied to FIG. 2.
Figure 6:
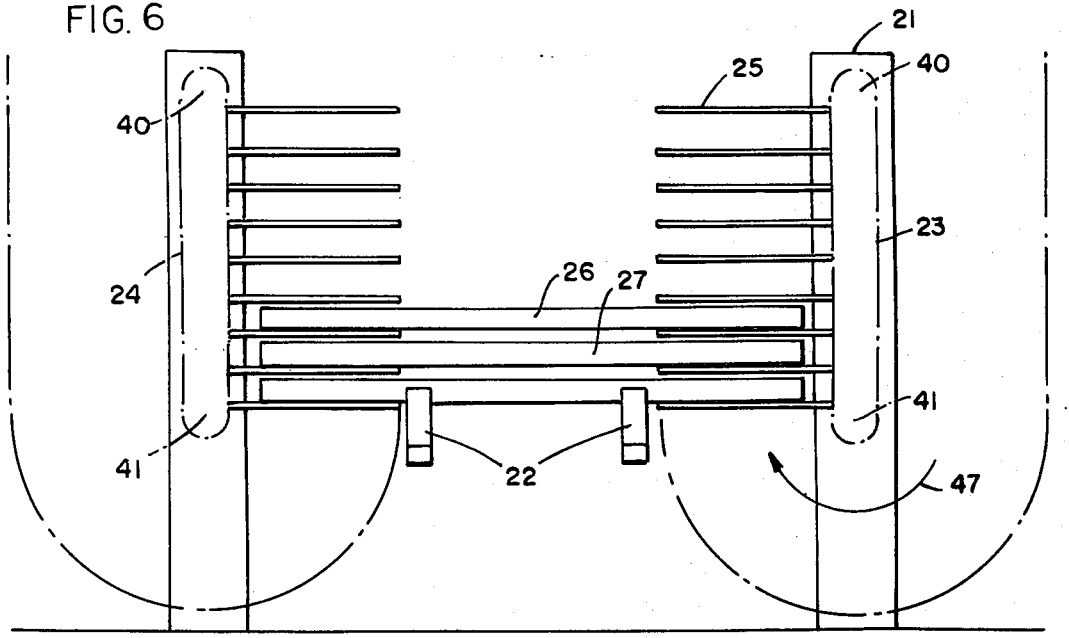
FIG. 6 is an elevational view such as would be seen along the sight line 6—6 applied to FIG. 2.

Essentially this is done by storing 10 logs on a horizontally traveling conveyor generally designated 22 (compare FIGS. 3 and 5). After the horizontally traveling conveyor has accumulated the predetermined number of logs (in the illustration given, 10), a pair of vertical conveyors 23 and 24 (see FIG. 6) come into play to simultaneously lift the ends of the log off of the horizontal conveyor 22 and thereby free the conveyor 22 for receiving another predetermined group of logs. When the second predetermined number is accumulated, the vertical conveyors 23 and 24 index once more so that the paddle-like supports 25 lift the second accumulation off of the horizontal conveyor buckets and this procedure continues serially for so long as logs are being supplied to the saw infeed conveyor 15 but are not required by the log saw 19. For example, in FIG. 6, we show the horizontal conveyor 22 operating on the third accumulation of logs, two previous sets having been elevated out of the path of the first conveyor 22 and positioned as at 26 and 27 in FIG. 6.

Figure 4:
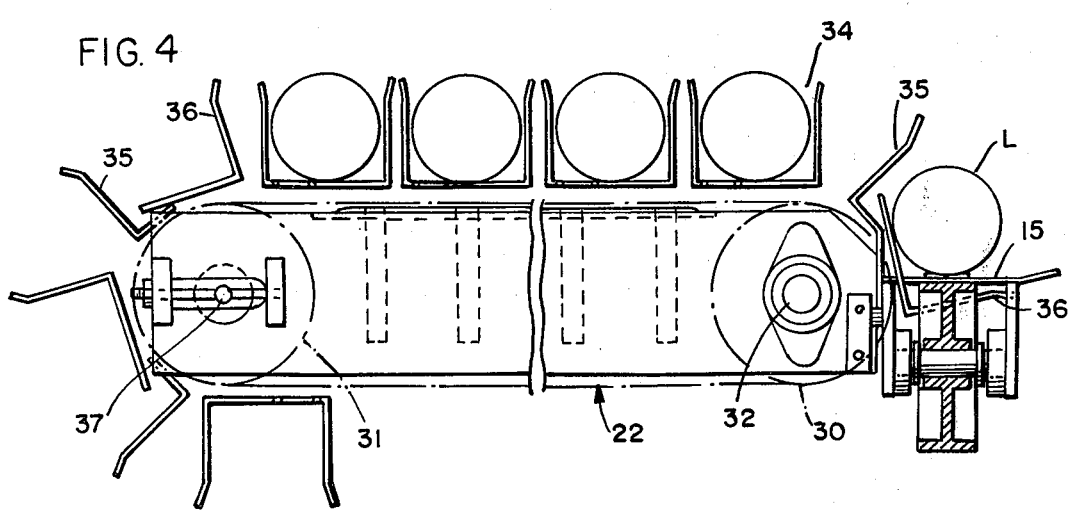
FIG. 4 is a side elevational view of the horizontal conveyor of the log storage unit.

Referring now to the second drawing sheet (FIGS. 3 and 4), it will be seen that the conveyor 22 is made up of two parallel belt loops 28 and 29 which are spaced apart but positioned so as to support a log intermediate the ends thereof. The belts are entrained about pulleys as at 30 and 31 (see FIG. 4) and driven through a common head shaft 32 by means of a chain sprocket drive 33 (see FIG. 3). Each belt is equipped with a plurality of buckets as at 34 with each bucket being defined by a pair of generally L-shaped members 35 and 36. As can be appreciated from FIGS. 3 and 4, the L-shaped members permit the sides of the bucket to articulate when going around the pulley 30 (in effect, opening the bucket) so as to more readily scoop up a log L positioned on the saw infeed conveyor 15. It will be appreciated that the head and tail shafts 30 and 37 (see FIG. 4) are journaled in suitable bearings (not shown) and secured to the frame 21. Thus, as the rewinder line is in the storage mode, the conveyor 22 operates to scoop logs sequentially from the infeed conveyor 15 and advance them along a generally horizontal path (perpendicular to the log axis) and in the direction of the arrow designated 38 in FIG. 5.

After a predetermined number of logs (10 in the illustration given) have been stored or accumulated on the horizontal conveyor 22, the coordinated vertical conveyors 23 and 24 come into operation. Each of the conveyors 23 and 24 includes a pair of endless chains as at 39 (see FIG. 1 relative to the conveyor 23). The conveyor chains are entrained about upper sprockets 40 (see FIG. 1) and lower sprockets 41 (see FIG. 6). The sprockets 40 (for example), are mounted on a common shaft 42 and the movement of the two conveyors 23 and 24 is coordinated by means of a drive interconnection 43 (see FIG. 1). Power to drive the two conveyors 23 and 24 is provided from a motor-gear reducting unit housed within the housing 44 — see the upper central portion of FIG. 1.

Each of the conveyors 23 and 24 is equipped with a plurality of paddles or support plates 25 (nine each in the illustration given) and which are in effect corrugated (see particularly FIG. 3) as at 45 to receive and support the ends of logs in a position and at a spacing corresponding to the arrangement developed by the horizontal conveyor 22. In other words, each paddle is equipped with spaced upset portions (as at 46 in FIG. 3) which extend parallel to the length of a log when the same is supported on the horizontal conveyor 22. As can be appreciated from FIG. 6, the paddles 25 in storing logs move from outside the frame 21 around the bottom sprockets 41 and upwardly inside the frame 21, i.e., in the direction of the arrow 47 associated with the conveyor 23 in FIG. 6.

OPERATION

In the operation of the rewinder line, more particularly, the log storage unit 20, the rewinder 11 and the log storage unit 20 are interlocked so that whenever the rewinder 11 is operating, the log storage unit 20 can only function in the storing mode, i.e., the horizontal storage conveyor 22 can only move in the direction of the arrow 38 whenever the rewinder 11 is functioning. This positively prevents logs being delivered to the log saw from two sources simultaneously.

Figure 7:
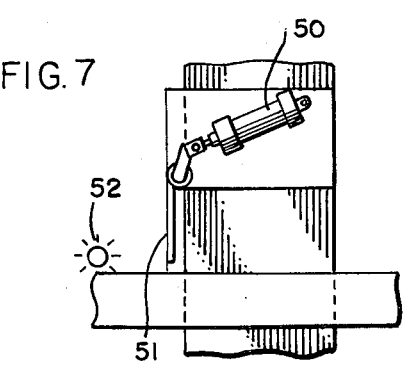
FIG. 7 is a fragmentary elevational view of a gate mechanism located in the position encircled in the lower central portion of FIG. 1 and designated by the numeral 7.

To initiate the storing operation, a signal must first be delivered from a switch 48 mounted in the roll down table 16 (see FIG. 2). The switch 48 senses the presence of logs not demanded by the log saw 19 into condition the system to store logs in the storage unit 20. This is done through energizing a plate switch 49 mounted at the downstream end of the saw infeed conveyor 15 (see FIG. 2). When the plate switch 49 is contacted by a successive log, it in turn activates the air cylinder 50 (see FIG. 7 and the circled portion of FIG. 1) to close the pivot gate 51 and thereby prevent the saw infeed conveyor 15 from conveying further logs down stream. An electric eye or photocell unit schematically represented at 52 in FIG. 7 is employed to trigger the operation of the horizontal conveyor 22. More particularly, the interruption of the beam developed by the photocell unit 52 causes the horizontal conveyor to index and have the top run of each belt 28 and 29 move away from the infeed conveyor 15 so as to scoop a log from the infeed conveyor 15 and place it in the storage condition. This indexing for storage continues until the horizontal deck or conveyor 22 has accumulated its predetermined number of logs — a situation which is sensed by limit switch 53. The limit switch 53 is shown schematically in the central portion of FIG. 2 and is arranged to be contacted by a lug (not shown) on one of the belts provided in the horizontal conveyor 22. Thus, as the tenth log (in the illustration given) has been moved into storage position, the limit switch 53 energizes the vertical conveyors 23 and 24 to index one set of paddles upwardly, thereby removing the logs previously stored in the horizontal conveyor 22. If the storage condition still exists, the subsequent interruption of the beam developed by the photocell 52 causes the conveyor 22 to continue its accumulating function and, again, after a predetermined number of logs have been received on the conveyor 22, the limit switch 53 is tripped to again energize the vertical conveyors 23 and 24. This operation continues seriatim for so long as logs are delivered onto the saw conveyor 15 but are not required by the log saw 19. During the storage mode, the gate 51 (also see in FIG. 2) is in the closed position (as seen in FIG. 7) and not only blocks the downstream movement of logs but serves to align the same for proper pickup by the conveyor 22.

When the log saw 19 demands additional logs and the upper portion of the roll down table 16 no longer supports additional logs, the switch 18 senses the absence of logs. This in turn removes energy from the plate switch 49 and opens the gate 51. As pointed out previously, if the rewinder is operating, the log storage unit 20 cannot enter into the delivery mode since the rewinder will provide sufficient logs for the log saw. However, when the log saw 19 demands logs not available on the roll down table 16 (as sensed by the switch 48), and when the rewinder 11 is not operational, the log storage unit 20 enters into its delivery mode by having the horizontal conveyor 22 move in reverse fashion. The logs are delivered sequentially (as sensed by the photocell unit 52). The delivery of the tenth log (or the log in the tenth position) trips another limit switch 54 causing the vertical conveyors 23 and 24 to descend and refurbish the horizontal conveyor 22 with another store of logs. The delivery mode continues until either the log storage unit is exhausted or the rewinder 11 starts operating, whichever occurs first.

We claim:

1. A method of log storage comprising advancing logs along a first path toward a log saw system, sensing the system requirements and when no further logs are required, advancing successive logs along a second path generally perpendicular to said first path and in a generally horizontal plane until a predetermined number of logs are accumulated, moving said predetermined number of logs as a group along a generally vertical path, thereafter advancing additional unrequired logs along said first path and continuing the advancement to reach accumulation and vertical movement seriatim until said system requires a log from said first path and thereupon retracting logs in said first path and after the log accumulation therein has been exhausted, reversely moving a group of logs in said vertical path to position the same in said said first path, and continuing the retraction and reverse movement seriatim so long as said system requires a log from said first path.

* * * * *